United States Patent [19]

Sargent

[11] Patent Number: 5,401,154

[45] Date of Patent: Mar. 28, 1995

[54] APPARATUS FOR COMPOUNDING A FIBER REINFORCED THERMOPLASTIC MATERIAL AND FORMING PARTS THEREFROM

[75] Inventor: Michael M. Sargent, Petoskey, Mich.

[73] Assignee: Continental Structural Plastics, Inc., Petoskey, Mich.

[21] Appl. No.: 67,219

[22] Filed: May 26, 1993

[51] Int. Cl.⁶ .................. B29B 11/04; B29B 11/16; B29C 43/18
[52] U.S. Cl. .................. 425/114; 264/108; 264/148; 264/174; 425/121; 425/126.1; 425/297; 425/327
[58] Field of Search .............. 264/148, 174, 349, 108, 264/210.1, 210.5, 211.12, 211.17, 211.2, 171, 211.22, 136, DIG. 65; 425/131.1, 126.1, 114, 121, 122, 325, 327, DIG. 39, 296, 297

[56] References Cited

U.S. PATENT DOCUMENTS

| 3,304,282 | 2/1967 | Cadus et al. | 264/349 |
|---|---|---|---|
| 3,453,356 | 7/1969 | Kent, Jr. et al. | 264/349 |
| 3,584,095 | 6/1971 | Heider et al. | 264/349 |
| 3,765,998 | 10/1973 | Oswald et al. | 264/136 |
| 3,787,352 | 1/1974 | Marzocchi et al. | 264/136 |
| 4,420,295 | 12/1983 | Clear et al. | 425/122 |
| 4,436,685 | 3/1984 | Emura et al. | 264/210.5 |
| 4,439,387 | 3/1984 | Hawley | 264/108 |
| 4,728,552 | 3/1988 | Jensen, Jr. | 428/91 |
| 4,897,233 | 1/1990 | Bier et al. | 264/349 |
| 4,910,064 | 3/1990 | Sabee | 428/113 |
| 4,925,729 | 5/1990 | Staneluis et al. | 428/71 |
| 4,931,358 | 6/1990 | Wahl et al. | 428/285 |
| 4,976,904 | 12/1990 | Bilhorn | 264/349 |
| 5,077,226 | 12/1991 | Lefkowitz | 428/141 |
| 5,085,928 | 2/1992 | Krueger | 428/287 |
| 5,118,550 | 6/1992 | Baravian et al. | 428/90 |
| 5,128,198 | 7/1992 | Dyksterhouse et al. | 428/240 |
| 5,165,941 | 11/1992 | Hawley | 264/349 |
| 5,176,775 | 1/1993 | Montsinger | 264/174 |
| 5,185,117 | 2/1993 | Hawley | 264/211.12 |
| 5,188,878 | 2/1993 | Takezawa et al. | 428/114 |
| 5,202,071 | 4/1993 | Nakamura et al. | 264/137 |
| 5,252,054 | 10/1993 | Ehnert et al. | 264/148 |

FOREIGN PATENT DOCUMENTS 0058101 8/1982 European Pat. Off. ............ 264/349

Primary Examiner—Jay H. Woo
Assistant Examiner—Duane S. Smith
Attorney, Agent, or Firm—Howard & Howard

[57] ABSTRACT

A twin screw extruder compounds a thermoplastic resin material with a randomly oriented fiber reinforcing material to produce a molten fiber reinforced thermoplastic extrusion from a die. The extrusion is cut into preforms which are immediately inserted into a compression mold for making parts. A unidirectionally oriented fiber reinforcing material can be added in the die. The fibers are monofilaments which are debundled and heated before entering either the extruder or the die.

15 Claims, 2 Drawing Sheets

APPARATUS FOR COMPOUNDING A FIBER REINFORCED THERMOPLASTIC MATERIAL AND FORMING PARTS THEREFROM

BACKGROUND OF THE INVENTION

The present invention relates generally to an apparatus and method for compounding a reinforced thermoplastic material and forming parts therefrom in a continuous process and, in particular, to an apparatus and method for continuously compounding a thermoplastic glass fiber reinforced material, extruding the material as a continuous extrusion having a predetermined cross section, cutting preforms from the extrusion and forming parts from the preforms.

The process of forming a sheet of reinforced thermoplastic material, such as glass fiber reinforced polypropylene, is well known. For example, the U.S. Pat. No. 4,439,387 shows a method of manufacturing a composite reinforcing structure by extruding fluid thermoplastic resin through an elongated die simultaneously with introducing a plurality of continuous fiber reinforcing strands into the die.

The U.S. Pat. No. 4,925,719 shows a high strength reinforced composite having an outer polymeric skin chemically and mechanically bonded to an inner foam core by an interface of longitudinally continuous strands, transversely continuous and randomly arrayed transverse strands, and randomly inclined short strands having end portions embedded in both the skin and the core.

The U.S. Pat. No. 4,931,358 shows a semifinished material formed of a thermoplastic polymer and a needled textile fabric made up of at least two layers of oriented continuous filament yarn and at least one layer of unoriented fibers.

The U.S. Pat. No. 5,085,928 shows a fiber reinforced composite matrix that includes one or more layers of unidirectional fibers alternated with one or more layers of a porous fibrous material all embedded in a thermoplastic resin.

The U.S. Pat. No. 5,185,117 shows a multiple extruder for compounding thermoplastic resin and random discrete length reinforcing fibers. The fibers are introduced into the inlet end of a compounding extruder, thermoplastic resin material is directed into a resin extruder, and molten thermoplastic material from the resin extruder is fed into a second port in the compounding extruder downstream from the fiber inlet whereby a homogeneous mixture of thermoplastic material and reinforcing fibers is discharged from the compounding extruder. The discharged material can be shaped into a preform which can be sent directly to a molding machine.

Also well known is the process of forming continuous filament webs. The U.S. Pat. No. 4,910,064 shows a non-woven web formed of a plurality of substantially parallel continuous filaments stabilized by melt blown fibers to create a coherent web.

The U.S. Pat. No. 5,077,116 shows a forming fabric for a papermaking machine having a base fabric made of interwoven machine direction and cross machine direction yarns and a non-woven array of fibrous strands adhered to one surface of the base fabric.

The U.S. Pat. No. 5,118,550 shows a substrate having a nonwoven sheet of synthetic textile material formed of unidirectional continuous filaments and reinforcing threads extending parallel in the lengthwise direction bonded to the textile material.

The U.S. Pat. No. 5,128,198 shows a preimpregnated fibrous material formed of a plurality of substantially parallel reinforcing filaments in between which is dispersed a polymeric water-soluble binding agent, an aqueous medium and solid particles of thermoplastic polymer.

The U.S. Pat. No. 5,188,878 shows a flexible, unidirectional thin glass prepreg having glass fiber monofilaments formed by spreading glass rovings in a thin layer, impregnating a matrix resin between the monofilaments and partially curing the resin.

SUMMARY OF THE INVENTION

The present invention concerns an apparatus for making a fiber reinforced thermoplastic material and forming parts therefrom. The apparatus includes an extruder having a first material inlet, a second material inlet and an outlet, the extruder compounding a thermoplastic resin material supplied at the first material inlet with a first fiber reinforcing material supplied at the second material inlet and discharging a molten random fiber reinforced thermoplastic material at the outlet. A source of the thermoplastic resin material having an outlet for feeding the thermoplastic resin material is positioned adjacent the first material inlet and a source of the first fiber reinforcing material having an outlet for feeding the first fiber reinforcing material is positioned adjacent the second material inlet. A die is connected to the extruder outlet for shaping the molten fiber reinforced thermoplastic material into a continuous extrusion of heated fiber reinforced thermoplastic material having a predetermined cross-sectional shape. The die can have a third material inlet and a source of a second fiber reinforcing material having an outlet for feeding the second fiber reinforcing material can be positioned adjacent the third material inlet. The second fiber reinforcing material combining with the molten fiber reinforced thermoplastic material whereby the extrusion contains a first predetermined amount of the first fiber reinforcing material randomly oriented and a second predetermined amount of the second fiber reinforcing material unidirectionally oriented.

The apparatus further includes a conveyor means having a first section positioned adjacent the die for drawing the extrusion at a predetermined speed from the die, a cutter means positioned adjacent the conveyor means for cutting the extrusion into at least one preform of a predetermined length and an enclosure surrounding at least a portion of the conveyor means for maintaining the extrusion and the preform at a predetermined temperature. A second section of the conveyor means moves the preform along a predetermined path and a compression mold positioned adjacent the second section of the conveyor means receives the preform and molds the preform into a fiber reinforced thermoplastic material part.

The method and apparatus according to the present invention improves cost competitiveness since it eliminates the extra step of reheating a reinforced thermoplastic preform prior to the molding step.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Typically, molders of parts formed of reinforced thermoplastic material purchase the material from a manufacturer in a desired preform such as a sheet or a mat. The mat can be formed of glass fibers and is layered in a thermoplastic resin such as polypropylene. The molder reheats the preform before inserting it into a molding machine to compression mold the desired part. However, such a procedure has many disadvantages including the inability to quickly change material composition and preform shape when required.

Figure 1:
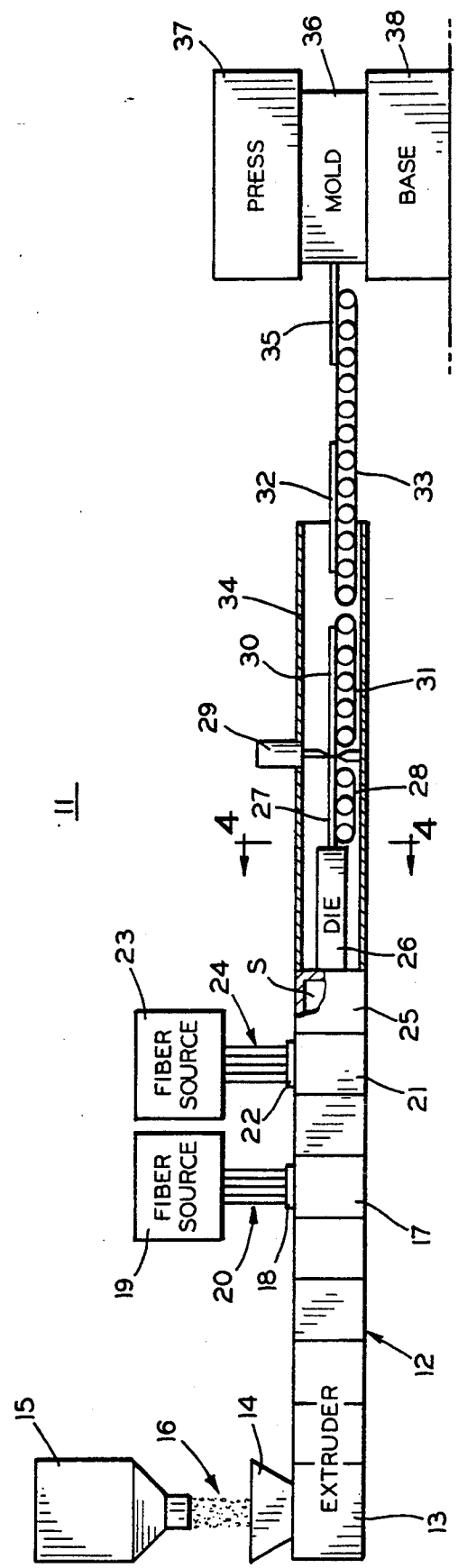
FIG. 1 is a schematic side elevation view of an apparatus for manufacturing and forming sheets of fiber reinforced thermoplastic material in accordance with the present invention.

There is shown in the FIG. 1 an apparatus 11 for continuously compounding a fiber reinforced thermoplastic material, extruding the material in the shape of a ribbon, cutting preform sheets from the ribbon and immediately forming parts from the still heated preform sheets. The apparatus 11 includes a multi-section barrel, twin screw compounding extruder 12 which has a barrel section one 13 positioned at an inlet end thereof with a raw material inlet 14. A thermoplastic material source 15 supplies raw thermoplastic material 16, such as polypropylene, to the inlet 14. If the raw material is hygroscopic, a dryer may be required to remove moisture before the material enters the inlet 14. The extruder 12 includes several intermediate sections which can be enclosed, or can have a material inlet at the top or side thereof. For example, a barrel section six 17 has a top inlet 18 adjacent a fiber source 19 for feeding a plurality of reinforcing fibers 20, such as glass fibers, into the molten thermoplastic material in the barrel. The extruder 12 also can include one or more additional intermediate inlet sections such as a barrel section eight 21 having a top inlet 22 adjacent a fiber source 23 for feeding a plurality of reinforcing fibers 24 into the molten thermoplastic material. A second fiber source may be required when it is desired to utilize fibers with different characteristics such as material, diameter or length. As explained below, the fibers 20 and 24 are mixed with the molten thermoplastic material as randomly oriented reinforcing fibers which can have any desired length. A barrel section nine 25 is positioned at an outlet end of the extruder 12 for discharging the molten thermoplastic material having reinforcing fibers added thereto. Thus, the number and type of sections which form the extruder 12 can be selected to suit the thermoplastic material and fibers being processed. Furthermore, the discharge end of the extruder 12 can include a material accumulator. For example, if the extruder screw does not extend into the barrel section nine 25, an interior cavity S of that section provides a space for accumulating a quantity of the molten fiber reinforced thermoplastic material. Additional barrel sections can be inserted between the sections 21 and 25 to increase the capacity of the accumulator cavity S.

The barrel section nine 25 has an outlet opening (not shown) connected to an inlet of a die 26 for feeding molten thermoplastic material containing reinforcing fibers into the die to be extruded into a desired shape. There exits from an outlet of the die 26 a continuous extrusion of a predetermined cross-sectional shape, such as a ribbon 27, of fiber reinforced thermoplastic material. As shown in the FIG. 3, the ribbon 27 has a generally rectangular cross section of predetermined thickness and width. The ribbon 27 is supported by a ribbon conveyor 28 running at a predetermined speed. The conveyor 28 delivers the ribbon 27 to a cutter device 29 which severs the ribbon in a direction transverse to the direction of travel to form individual sheets of the thermoplastic reinforced material such as a sheet 30. The sheet 30 is supported on a first sheet conveyor 31 which is driven at the same speed as the ribbon conveyor 28. The first sheet conveyor 31 will transport the sheets cut from the ribbon 27, such as a preceding sheet 32, to a second sheet conveyor 33 which is driven at a faster speed to separate the sheets 30 and 32. The die 26, the conveyors 28 and 31, a portion of the cutter 29 and at least a portion of the conveyor 33 are surrounded by a temperature control enclosure 34 which maintains the sheets at a molding temperature. A sheet 35, preceding the sheet 32 on the conveyor 33, is shown entering a mold 36. The mold 36 is a compression type mold actuated by a press 37 supported on a base 38.

Figure 2:
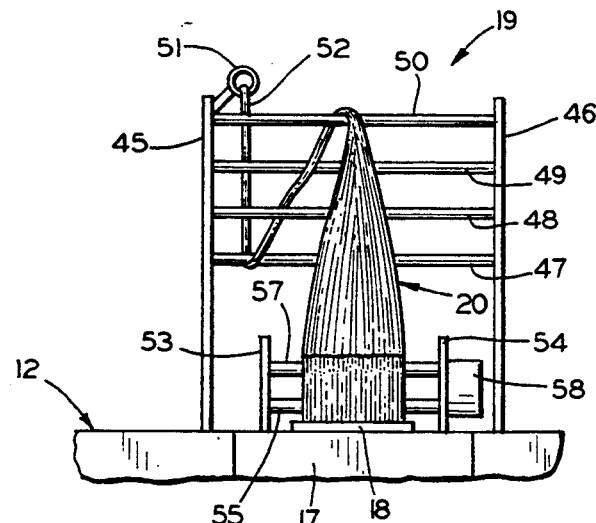
FIG. 2 is a side elevation view of the fiber source shown in the FIG. 1.
Figure 3:
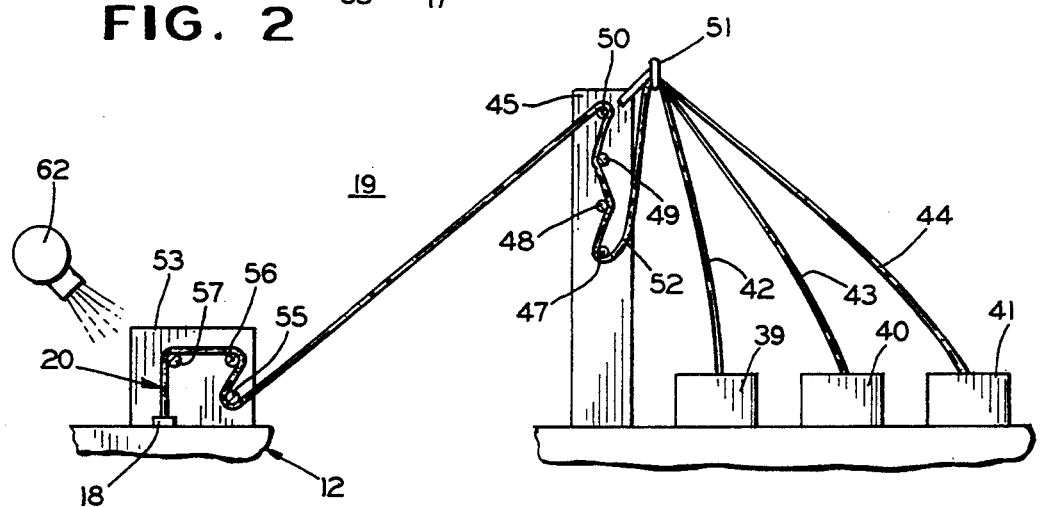
FIG. 3 is a front elevation view of the fiber source shown in the FIG. 2.

The fiber source 19 is shown in more detail in the FIGS. 2 and 3. Typically, a bundle of fibers is formed of a plurality of monofilament fibers converged into a thread and a plurality of these threads converged into a bundle for shipment to a customer. Since the monofilaments and the threads can be twisted, distorted and wound about one another, the bundle must be spread in order to distribute the fibers throughout the thermoplastic material. As shown in the FIG. 3, a fiber bundle container 39, a fiber bundle container 40 and a fiber bundle container 41 each store a coiled fiber bundle such as a fiber bundle 42, a fiber bundle 43 and a fiber bundle 44 respectively. The fiber bundles 42, 43 and 44 are drawn from the respective containers through a plurality of generally horizontally extending rods supported between a pair of spaced apart generally vertically extending uprights 45 and 46. A lower first rod 47 extends between the uprights 45 and 46 as do intermediate rods 48 and 49 and an upper rod 50. The fiber bundles 42, 43 and 44 extend through a ting guide 51 attached to an upper end of the upright 45 and are combined into a bundle 52. The combined bundle 52 extends downwardly from the ring guide 51 and around the lower rod 47. The combined bundle 52 continues in a curved path around the rods 48 and 49 and over the upper rod 50 toward the extruder 12.

Mounted on the extruder 12 is a pair of spaced apart uprights 53 and 54. Extending between the uprights 53 and 54 are a lower roller 55 and a pair of upper rollers 56 and 57. The rollers 55, 56 and 57 are coupled to and driven in rotation by a motor 58 mounted on the upright 54. The rollers 55, 56 and 57 draw the fibers 20 under tension whereby the combined bundle 52 is spread apart into a plurality of continuous monofilaments before entering the inlet 18. Inside the extruder barrel, the extruder screw (not shown) cuts or chops the continuous monofilaments into discrete length fibers and randomly orients these fibers in the molten thermoplastic material. In some cases, an extruder screw design can be selected which will not cut or chop at least some of the monofilaments whereby random continuous monofilaments result.

In the alternative, the fiber source 19 could be a supply of chopped fibers which are fed into the inlet 18 in a manner similar to the raw material 16. The fiber source 23 and any additional fiber source feeding into the extruder 12 can be of a similar construction.

Figure 4:
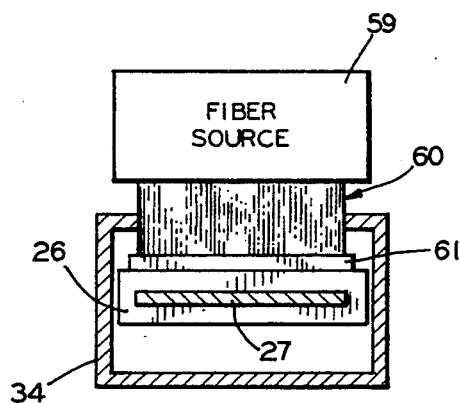
FIG. 4 is a cross sectional view of the die and enclosure taken along the line 4—4 in the FIG. 1 and incorporating an additional fiber source.
Figure 5:
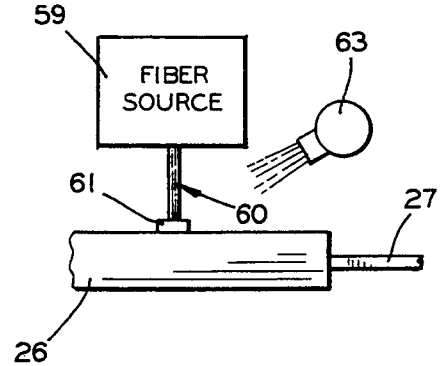
FIG. 5 is a side elevation view of the die, enclosure and fiber source shown in the FIG. 4.

There is shown in the FIG. 4, a cross-sectional view of the die 26 and enclosure 34 shown in the FIG. 1. The die 26 forms the molten thermoplastic material into the sheet 27 having a predetermined thickness and a predetermined width. If it is desired to add unidirectional reinforcing fibers to the molten thermoplastic material, the fiber source must be located downstream of the extruder 12 since the unidirectional fibers are continuous and extend in the direction of the longitudinal axis of the ribbon 27. As shown in the FIGS. 4 and 5, a fiber source 59 is located above the die 26. A plurality of monofilament reinforcing fibers 60 are fed from the fiber source 59 into an inlet 61 in the top of the die 26. The fiber source 59 can be any suitable device for feeding a plurality of monofilaments spread across the width of the ribbon 27 such as the fiber source 19 turned transverse to the path of travel of the ribbon 27.

It is desirable to heat the reinforcing fibers before they are added to the thermoplastic material to aid bonding. There is shown in the FIG. 3 a source of heated air 62 positioned adjacent the inlet 18 for heating the reinforcing fibers 20 before they enter the extruder 12. An enclosure can be provided which extends between the uprights 53 and 54 with an opening for the fibers being drawn over the rod 50 and another opening for the heated air from the source 62. Although not shown, a similar heated air source would be used with the fiber source 23 in a similar manner. There is shown in the FIG. 5 a source of heated air 63 positioned adjacent the inlet 61 for heating the reinforcing fibers 60 being fed from the fiber source 59 before they enter the die 26.

The process of compounding the base material according to the present invention is the same for random fibers and unidirectional fibers, since the unidirectional material consists of approximately 50% random and approximately 50% unidirectional fibers. As explained above, the difference will be in the downstream equipment incorporating the unidirectional fibers with the random fibers added in the extruder.

The process according to the present invention combines fibers and a thermoplastic resin in such a way that the properties of the prior art glass mats layered in polypropylene are duplicated. Furthermore, a better textured surface finish can be achieved.

The preferred embodiment of the present invention utilizes a co-rotating twin screw extruder having a sectional barrel and designed for high output and superior control of the process. However, in the apparatus according to the present invention, the extruder is intentionally run at low output, compared to actual machine capacity, and interchangeable screw configurations allow selective control of the process. Each screw design results in a different glass distribution, therefore creating different material properties. Furthermore, a one piece barrel could be used where the material compounding process remains constant.

The twin screw extruder is used to introduce long strand reinforcing fibers into a thermoplastic resin. Depending on screw design, random fiber lengths from 1/32" to continuous can be used. The reinforcing fibers are introduced into the twin screw extruder at a point downstream of the inlet point for the thermoplastic resin, so that the resin is mechanically worked and heated before coming into contact with heated reinforcing fibers. The extrudate from the twin screw extruder consists of a homogeneous, molten mass of thermoplastic resin having fibers randomly dispersed within. The fiber feeding system heats the fibers and organizes them into a specific size and shape. The molten reinforcing material is then introduced into secondary equipment such as a die to determine the size, weight and shape of the preform being made. Unidirectional reinforcing fibers can be introduced in the die. The preform can then be fed into a compression molding machine.

Tension on the fibers is essential. Tension causes the fiber bundles to fan out thereby increasing the debundling of the monofilaments as they enter the extruder, thereby generating a better distribution of the fibers in the thermoplastic resin. This increases the product strength and provides a better surface finish.

Of course the physical properties of the fiber reinforced material also depend upon the resin selected and the fiber content. Typical glass percentages are 20%, 30%, 40%, and 50%. With the process according to the present invention, the glass percentage can be varied immediately to achieve the required physical properties of the parts to be formed.

The die 26 is a relatively long low pressure die which draws resin to the surface of the molten material exiting the extruder. This resin rich surface creates a class A textured surface. As stated above, the die forms a continuous extrusion of any desired cross-sectional shape.

Although an example utilizing glass fibers and polypropylene resin has been discussed, other fibers such as carbon graphite and kevlar are suitable. The base resin can be nylon, PPO, PPS, or any other base polymer.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for making a fiber reinforced thermoplastic material and forming parts therefrom comprising:

an extruder having a first material inlet, a second material inlet and an outlet for compounding a thermoplastic resin material supplied at said first material inlet with a reinforcing fiber material supplied at said second material inlet and discharging a molten fiber reinforced thermoplastic material at said outlet;

a source of the thermoplastic resin material laving an outlet for feeding the thermoplastic resin material into said first material inlet;

a source of the fiber reinforcing material having an outlet for feeding the fiber reinforcing material into said second material inlet;

a die connected to said extruder outlet for shaping the molten fiber reinforced thermoplastic material into a continuous extrusion of heated fiber reinforced thermoplastic material containing the fiber reinforcing material randomly oriented and having a desired cross-sectional shape;

a conveyor means having a first section position adjacent said die for drawing the extrusion from said die;

a cutter means positioned adjacent said first section of said conveyor means for cutting the extrusion into a plurality of preforms;

said conveyor means having a second section positioned adjacent said cutter means for moving the preforms away from said cutter means;

a compression mold positioned adjacent said second section of said conveyor means for receiving the preforms and molding each of the preforms into a fiber reinforced thermoplastic material part; and a temperature control enclosure positioned between said extruder outlet and said compression mold and through which both said first and second sections of said conveyor means passes and in which said cutter is also enclosed, for maintaining the extrusion and the preforms at a molding temperature.

2. The apparatus according to claim 1 wherein said source of the fiber reinforcing material is a source of chopped fibers.

3. The apparatus according to claim 1 wherein said source of the fiber reinforcing material is a source of continuous fibers.

4. The apparatus according to claim 3 wherein said source, of the fiber reinforcing material includes means for debundling monofilaments in a bundle of the continuous fibers formed of a plurality of monofilaments.

5. The apparatus according to claim 3 wherein said source of the fiber reinforcing material includes means for tensioning a bundle of the continuous fibers.

6. The apparatus according to claim 3 wherein said source of the fiber reinforcing material includes a pair of spaced apart uprights, a plurality of spaced apart rods extending between said uprights and means for drawing a bundle of the continuous fibers in a curved path about said rods for debundling monofilaments in the bundle.

7. The apparatus according to claim 6 wherein said means for drawing includes another pair of spaced apart uprights, a plurality of rollers extending between said uprights and means for driving connected to said rollers for rotating said rollers and drawing the bundle of continuous fibers in a curved path about said rollers.

8. The apparatus according to claim 1 wherein said conveyor means includes a third section positioned between said second section and said compression mold for moving the preforms between said second section and said compression mold.

9. The apparatus according to claim 8 wherein said first and second sections of said conveyor move at approximately the same speed and said third section moves at a faster speed.

10. The apparatus according to claim 1 including a third material inlet in one of said extruder and said die and another source of a fiber reinforcing material having an outlet for feeding another fiber reinforcing material into laid third material inlet.

11. The apparatus according to claim 10 including a source of heated air positioned adjacent said another source of fiber reinforcing material for heating the another fiber reinforcing material before the another fiber reinforcing material enters said third material inlet.

12. The apparatus according to claim 1 including a source of heated air positioned adjacent said source of fiber reinforcing material for heating the fiber reinforcing material before the fiber reinforcing material enters said second material inlet.

13. The apparatus according to claim 1 wherein said die has an outlet for shaping the extrusion as a ribbon and said cutter means cuts each of the preforms as a sheet of the fiber reinforced material from the ribbon.

14. The apparatus according to claim 1 including an accumulator cavity formed in said extruder adjacent said outlet for accumulating a quantity of the molten random fiber reinforced thermoplastic material.

15. An apparatus for making a fiber reinforced thermoplastic material and forming parts therefrom comprising:

an extruder having a first material inlet, a second material inlet and an outlet for compounding a thermoplastic resin material supplied at said first material inlet with a first fiber reinforcing material supplied at said second material inlet and discharging a molten random fiber reinforced thermoplastic material at said outlet;

a source of the thermoplastic resin material having an outlet for feeding the thermoplastic resin material into said firs material inlet;

a source of the first fiber reinforcing material having an outlet for feeding the first fiber reinforcing material into said second material inlet;

a die connected to said extruder outlet for shaping the molten fiber reinforced thermoplastic material into a continuous extrusion of heated fiber reinforced thermoplastic material having a desired cross-sectional shape, said die having a third material inlet;

a source of a second fiber reinforcing material ha ting an outlet for feeding the second fiber reinforcing material into said third material inlet, the second fiber reinforcing material combining with the molten fiber reinforced thermoplastic material whereby the extrusion contains the first fiber reinforcing material randomly oriented and the second fiber reinforcing material unidirectionally oriented;

a conveyor means having a first section positioned adjacent said die for drawing the extrusion from said die;

a cutter means positioned adjacent said first section of said conveyor means for cutting the extrusion into a plurality of preforms;

a second section of said conveyor means positioned adjacent said cutter means for moving the preforms away from said cutter means;

a compression mold positioned adjacent said second section of said conveyor means for receiving the preforms and molding each of the preforms into a fiber reinforced thermoplastic material part; and a temperature control enclosure positioned between said extruder outlet and said compression mold through which both said first and second sections of said conveyor means extends and in which said cutter means is also received, for maintaining the extrusion and the preforms at a molding temperature.

* * * * *